United States Patent
Croslin

(10) Patent No.: US 6,295,275 B1
(45) Date of Patent: Sep. 25, 2001

(54) DYNAMIC ROUTE GENERATION FOR REAL-TIME NETWORK RESTORATION USING PRE-PLAN ROUTE GENERATION METHODOLOGY

(75) Inventor: William David Croslin, Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/136,034

(22) Filed: Aug. 19, 1998

(51) Int. Cl.[7] .............................. G01R 11/00; H02H 3/05
(52) U.S. Cl. .................... 370/216; 370/220; 370/238; 340/825.03; 714/4; 709/238
(58) Field of Search .................... 370/216, 217, 370/218, 219, 220, 225, 228, 239, 238, 227; 340/825.03, 826, 827, 825.01; 709/238, 239, 241; 714/1–4

(56) References Cited

U.S. PATENT DOCUMENTS

| | | | |
|---|---|---|---|
| 5,459,716 * | 10/1995 | Fahim et al. | 370/224 |
| 5,646,936 * | 7/1997 | Shah et al. | 370/228 |
| 5,832,196 * | 11/1998 | Croslin | 370/228 |
| 5,881,048 * | 3/1999 | Croslin | 370/228 |
| 5,991,264 * | 11/1999 | Croslin | 370/225 |
| 5,995,485 * | 11/1999 | Croslin | 370/216 |
| 5,999,103 * | 12/1999 | Croslin | 340/825.01 |

* cited by examiner

*Primary Examiner*—Alpus H. Hsu
*Assistant Examiner*—Afsar M. Qureshi

(57) ABSTRACT

A restoral route generation process combines elements of a pre-plan methodology with a dynamic route generation methodology. The resulting hybrid approach quickly produces a restoral route in real time that has a minimal associated cost. The hybrid approach pre-generates sub-routes that are combined to produce a restoral route. The combining of the sub-routes takes place dynamically in response to a network failure. The hybrid approach may interactively operate to generate restoral routes for each trunk in the network that is affected by an outage.

16 Claims, 13 Drawing Sheets

|  | 1st Series | |
|---|---|---|
| Node | Left-Side | Right-Side |
| A | A (null) | |
| B | B (null) | |
| C |  | C (null) |
| D |  | D (null) |
| E | A (cost)<br>B (cost) | |
| F | A (cost)<br>B (cost) | C (cost) |
| G | B (cost) | D (cost)<br>C (cost) |
| H |  | D (cost)<br>C (cost) |
| I | A (cost)<br>B (cost) | |
| J | A (cost)<br>B (cost) | |
| K |  | C (cost) |
| L |  | D (cost) |
| M | A (cost) | |
| N | A (cost) | D (cost) |
| P | A (cost) | D (cost) |
| Q |  | D (cost) |

FIG. 10

|  | 1st Series | | 2nd Series | |
| --- | --- | --- | --- | --- |
| Node | Left-Side | Right-Side | Left-Side | Right-Side |
| A | A *(null)* | | A *(null)* | |
| B | B *(null)* | | B *(null)* | |
| C | | C *(null)* | | C *(null)* |
| D | | D *(null)* | | D *(null)* |
| E | A *(cost)* | | A *(cost)*<br>F *(cost)*<br>I *(cost)*<br>J *(cost)* | G *(cost)* |
| F | B *(cost)* | | B *(cost)*<br>E *(cost)*<br>I *(cost)*<br>J *(cost)* | G *(cost)*<br>H *(cost)*<br>K *(cost)* |
| G | | C *(cost)* | E *(cost)*<br>F *(cost)*<br>J *(cost)* | C *(cost)*<br>H *(cost)*<br>K *(cost)*<br>L *(cost)* |
| H | | D *(cost)* | F *(cost)* | D *(cost)*<br>G *(cost)*<br>K *(cost)*<br>L *(cost)* |
| I | A *(cost)*<br>B *(cost)* | | A *(cost)*<br>B *(cost)*<br>E *(cost)*<br>F *(cost)*<br>J *(cost)* | |
| J | A *(cost)*<br>B *(cost)* | | A *(cost)*<br>B *(cost)*<br>E *(cost)*<br>F *(cost)*<br>I *(cost)* | G *(cost)* |
| K | | C *(cost)* | F *(cost)* | C *(cost)*<br>G *(cost)*<br>H *(cost)* |
| L | | D *(cost)* | | D *(cost)*<br>G *(cost)*<br>H *(cost)* |
| M | A *(cost)* | | A *(cost)*<br>N *(cost)* | P *(cost)* |
| N | A *(cost)* | | A *(cost)*<br>M *(cost)* | P *(cost)*<br>Q *(cost)* |
| P | | D *(cost)* | M *(cost)*<br>N *(cost)* | D *(cost)*<br>Q *(cost)* |
| Q | | D *(cost)* | N *(cost)* | D *(cost)*<br>P *(cost)* |

FIG. 11

DYNAMIC ROUTE GENERATION FOR REAL-TIME NETWORK RESTORATION USING PRE-PLAN ROUTE GENERATION METHODOLOGY

TECHNICAL FIELD

The present invention relates generally to telecommunications systems and more particularly to dynamic route generation for real time network restoration using a pre-plan generation methodology.

BACKGROUND OF THE INVENTION

Telecommunications networks are subject to failure and must be restored after failure. Two competing methodologies have evolved to devise plans to restore telecommunications networks after failure: pre-plan and dynamic route generation. In the pre-plan methodology, restoral routes are generated for every traffic route within the network prior to network failure. Plans are then created to implement the restoral routes. These plans are known as "pre-plans," and each pre-plan contains a set of commands for issuance to restoration network devices to activate the restoral routes. "Restoration network devices" are devices, such as digital cross connects (DXCs), that are used to restore traffic on the network in the event of network failure.

The pre-plan methodology has the benefit of generating optimal restoral routes. In general, all possible restoral routes ("pre-plans") within a given a cost limit are generated for each traffic trunk, and the best (i.e., lowest cost) restoral route among those generated is selected for use in restoring the network. A major disadvantage of the pre-plan methodology is that it takes a long time to generate a batch of pre-plans for an entire telecommunications network. Moreover, given that network topology is generally very dynamic, there is a great likelihood that the pre-plans are quickly outdated after generation.

In the dynamic route generation methodology, a restoral route is generated for an impacted traffic route in real time in response to the network failure. Dynamic route generation is also referred to as "real time restoration." Dynamic route generation generally places a cost limit on possible restoral routes and only generates the routes that fall within the cost limit. Typically, the cost limits used in pre-plan route generation are substantially higher than those used in dynamic route generation. The low cost limits employed in dynamic route generation ensure that very few routes are generated and considered; hence, increasing the speed with which a restoral route is generated.

One advantage of the dynamic route generation methodology is that it is very fast and uses current topology data. There is no need to generate a massive set of pre-plans as in the pre-plan methodology. A disadvantage suffered by the dynamic route generation methodology is that it often selects sub-optimal restoral routes for the sake of speed.

SUMMARY OF THE INVENTION

The present invention addresses the limitations of the prior art by providing a hybrid approach that combines the benefits of the pre-plan methodology with the benefits of the dynamic route generation methodology. In one embodiment of the present invention, pre-plan sub-routes are generated, where each sub-route is a portion of the network that may be used in formulating a restoral route. Lowest cost sub-routes are combined to quickly produce a low cost restoral route. The restoral route is dynamically generated using the pre-plan generated sub-routes.

In accordance with a first aspect of the present invention, a method is practiced in a telecommunications network that has nodes which are interconnected by connections. The telecommunications network also includes a computing resource for directing restoration of the network from a failure. The computing resource generates restoral sub-routes where each restoral sub-route is a portion of the network that has nodes and connections that connect the nodes. These nodes include end nodes that correspond to respective ends of the sub-routes. Each restoral sub-route has an associated cost less than a threshold cost amount. A failure is identified in the network and a traffic route that is impacted by the failure is also identified. The traffic route includes nodes that are logically divisible into nodes positioned on the left side of the failure and nodes on the right side of the failure. Selected ones of the sub-routes that have a selected end node that is one of the nodes of the traffic route impacted by the failure are identified. The end node is positioned on the left side of the failure are identified. Given ones of the sub-routes are identified where the given sub-routes have an end node that is one of the nodes of the traffic route that is impacted by the failure and the given end node is positioned on the right side of the failure. One of the selected left side sub-routes and one of the given right side sub-routes are employed to create a restoral route for restoring the telecommunications network from failure.

In accordance with a further aspect of the present invention, a data structure is provided for storing information about a sub-route. The sub-route constitutes a route formed by the subset of the nodes and the connections that may be used in formulating restoral routes to recover from a failure in a telecommunications system. Information regarding a first end node and a second end node of the sub-route is stored in the data structure. Information stored in the data structure is used in formulating a restoral route.

In accordance with another aspect of the present invention, a method of generating restoral routes for failure in a network that affects nodes along a given traffic route is practiced in the telecommunications network. Sub-routes are identified that include as an end node one of the nodes on a given traffic route. A first subset of the sub-routes that share common end nodes that are not on the given traffic routes are identified. If there are sub-routes in the first subset, sub-routes are selected that when combined produce the restoral route based upon their associated costs.

In accordance with yet another aspect of the present invention, a telecommunications network has a restoration system and nodes that are interconnected by connections. The restoration system includes a sub-route generator for generating sub-routes. The sub-routes have costs that do not exceed a cost limit. Each sub-route is a path network that interconnects selected nodes. The restoration system also includes a restoral route generator for dynamically generating restoral routes for restoring the network in response to the failure of the network. The restoral route is created from a first and a second sub-route that is generated by the sub-route generator.

The present invention may also be practiced with a pre-plan methodology. In particular, failure spans are identified in the network and restoral routes are generated for each failure span. The restoral routes are generated from sub-routes as described above.

BRIEF DESCRIPTION OF THE DRAWINGS

An illustrative embodiment of the present invention will be described below relative the following drawings:

FIG. 10 illustrates an example of an intersection table that includes results of a single series of analyses.

FIG. 11 illustrates an example of an intersection table that holds the results of two series of analyses.

DETAILED DESCRIPTION OF THE INVENTION

The illustrative embodiment of the present invention provides an approach to generating restoral plans for a telecommunications network that chooses close to optimal restoral routes without incurring the large time and computation overhead traditionally associated with pre-plan methodologies. The illustrative embodiment adopts a dynamic route generation approach that employs a route generation process akin to a pre-plan methodology. The route generation process is streamlined so that it can be executed with the speed necessary for real time restoration. The streamlined approach processes network topology data to generate a large number of possible restoral sub-routes. For each traffic trunk that is impacted by the failure, selected sub-routes are combined to generate restoral routes.

The illustrative embodiment has the benefit of being substantially faster than the pre-plan methodology. The restoral routes generated by the illustrative embodiment are close to optimal, unlike the restoral routes generated by traditional dynamic route generation methodologies. The "sub-routes" include partial restoral routes and complete restoral routes.

Figure 1:
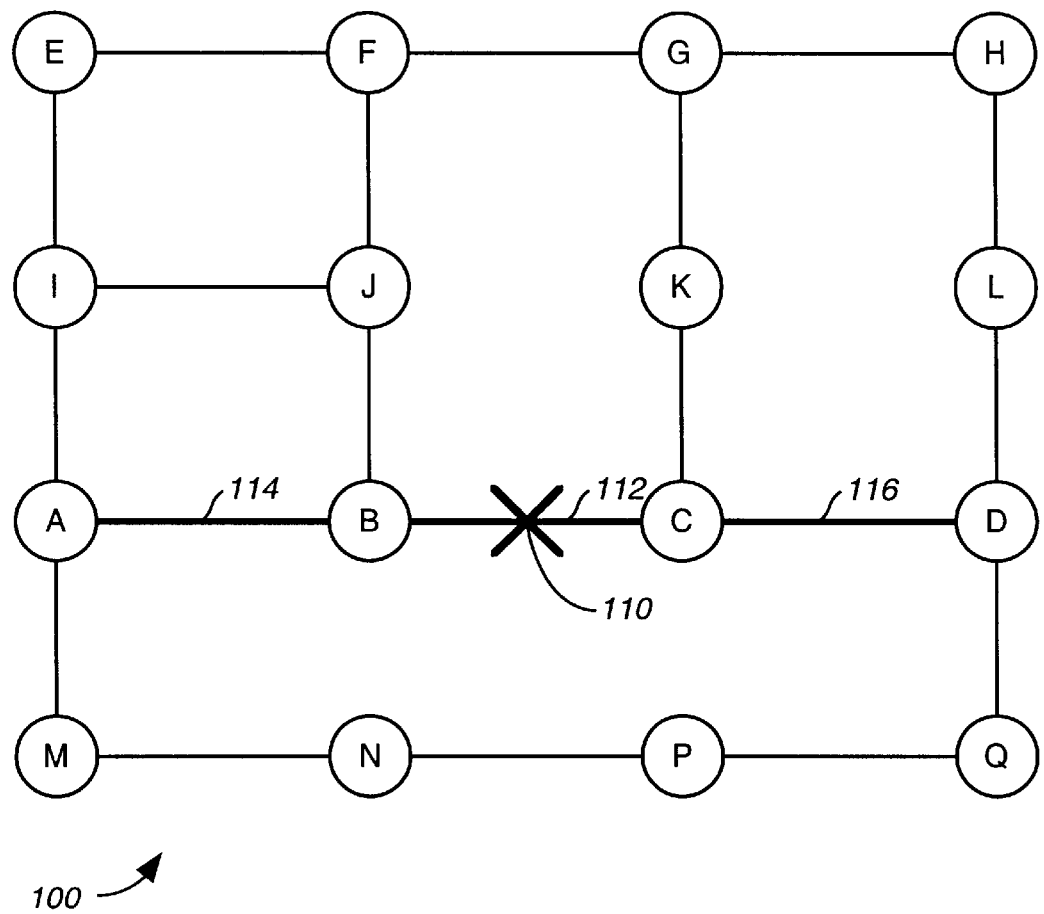
FIG. 1 illustrates the topology of a telecommunications network that is suitable for practicing the illustrative embodiment of the present invention.

FIG. 1 depicts the topology of a telecommunications network 100 in which the illustrative embodiment of the present invention may be practiced. A "telecommunications network," as used herein, includes any computer network, telephone network or other combination of nodes that communicate with each other that can carry both voice and data. A "node" refers to a point of connection into a network. The telecommunications network 100 includes restoration nodes (labeled A-Q in FIG. 1). Each restoration node is a network device that is used to restore traffic in the event of a network outage or failure. These restoration nodes may be DXCs, which are complex digital switches capable of automatically switching trunks upon external command. A "trunk" is a logical channel of communication capacity which traverses one or more nodes and one or more links between nodes. In the depiction shown in FIG. 1, it is assumed that a single trunk connects restoration node A with restoration node D (note the boldface line interconnecting the nodes A-B-C-D).

The nodes shown in FIG. 1 are interconnected by spans of network capacity. Some of the spans are designated to carry live traffic whereas other spans are designated to carry spare capacity (which is used in restoration of the network). Although a single line is depicted in FIG. 1 to interconnect nodes, each line represents several spans, where each span is capable of carrying a plurality of trunks. A single span may, for example, support one or more DS3 trunks. The trunk between nodes A and D traverses spans 112, 114 and 116. More generally, connections exist between nodes to facilitate communications among the nodes.

Those skilled in the art will appreciate that the network topology depicted in FIG. 1 is intended to be merely illustrative and not limiting of the present invention. The present invention may be practiced with other networks that include a different number of restoration nodes.

Figure 2:
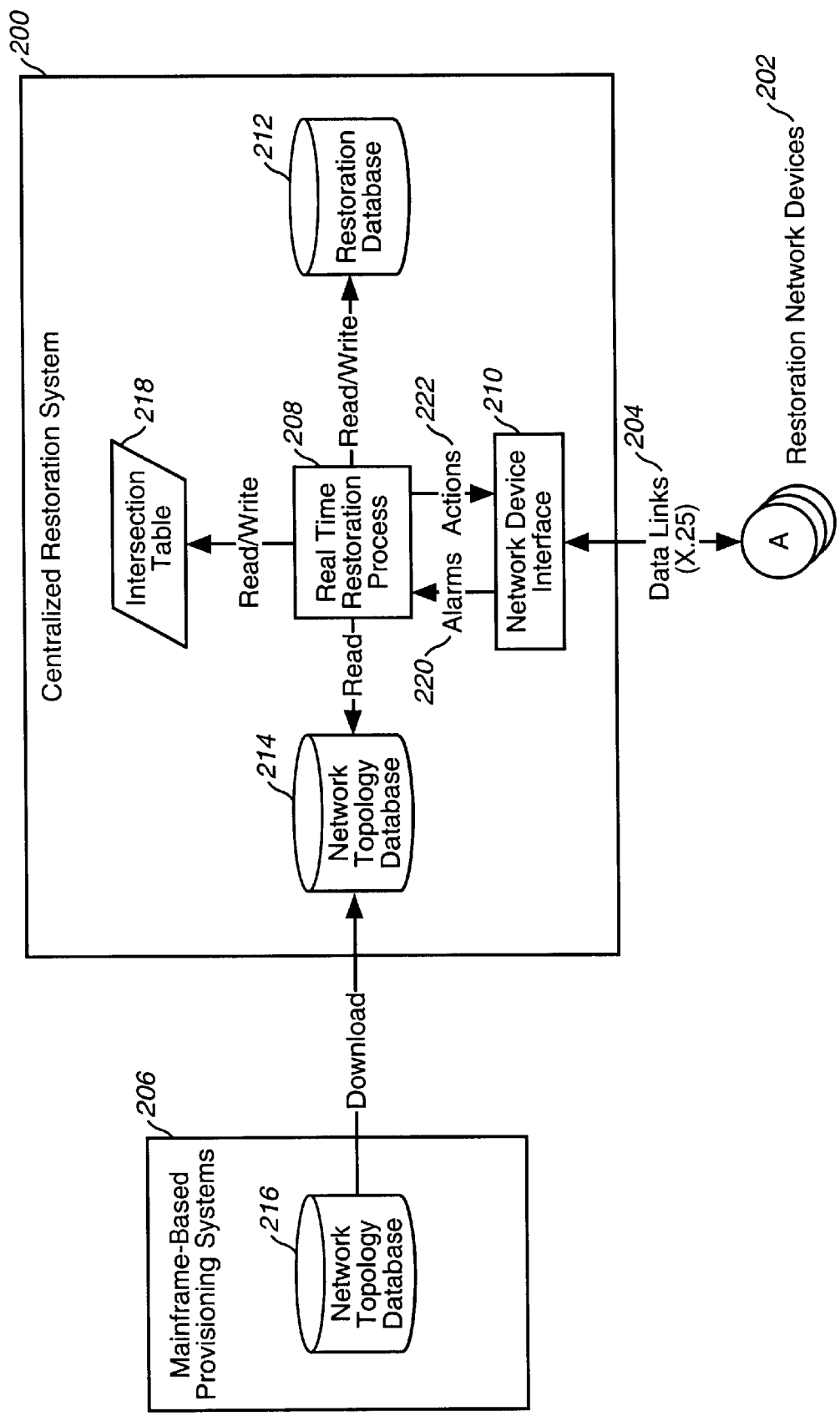
FIG. 2 illustrates a centralized restoration system for dynamically generating restoral routes in accordance with the illustrative embodiment of the present invention.

FIG. 2 depicts a centralized restoration system 200 that is suitable for practicing the illustrative embodiment of the present invention. The centralized restoration system 200 is responsible for issuing commands to the restoration network devices 202 in order to restore the network after outage or failure. The centralized restoration system acts as a restoral route generator for generating restoral routes. Data links 204, such as those found in X.25 networks, connect the restoration network devices 202 with the centralized restoration system 200. The centralized restoration system 200 also has an interface with a provisioning system 206 for updating the topology of the network 200 based on customer demands and needs. In the illustrative embodiment of the present invention, the provisioning system 206 is implemented using a mainframe computer system. Those skilled in the art will appreciate that a mainframe computer system need not be used; rather other types of computing systems may be used. The provisioning system 206 includes a network topology database 216 that holds topology data regarding the telecommunications network 100. This topology data may be downloaded to the centralized restoration system 200 as needed (see Step 214 in FIG. 2). The nature of the topology data and the use of the topology data by the centralized restoration system 200 will be described in more detail below.

The centralized restoration system 200 may be implemented via computer processes on one or more computer systems. For example, the centralized restoration system 200 may be implemented as computer software package that runs on multiple server computer systems, such as a cluster of servers that employ the DEC Alpha processor from Digital Equipment Corporation. In general, the centralized restoration system may be implemented using a computing resource that implements the functionality described herein. The computing resource may be, for example, a computer system, a digital switch or other device that has a microprocessor.

The centralized restoration system 200 includes one or more storage devices for storing data and programs (as will be described below). The storage devices may include different varieties of devices, such as RAM, ROM, PROM, EPROM, EEPROM, magnetic disk drives, optical disk drives and/or floppy disk drives.

The centralized restoration system 200 includes a network device interface 210 that manages communications between the restoration network devices 202 and the centralized restoration system 200. The restoration network devices 202 need not all be alike; rather they may be different varieties of physical devices. The network device interface 210 receives alarms 220 from the restoration network devices 202 when a network failure occurs and also receives actions 222 from a real time restoration process 208 for implementing restoral routes.

The centralized restoration system 200 runs the real time restoration process 208 to oversee restoration of the network 100. The real time restoration process 208 may be implemented as a set of executable programs. The real time restoration process 208 reads and writes data from a restoration database 212. This data includes a series of tables that are utilized in developing restoral routes. The real time restoration process 208 reads data from a copy of network topology database 214, which has been copied from the provisioning system 206. As was mentioned above, this database 214 includes network topology data, such as records having data about nodes, spans and ports. The real time restoration process 208 builds and utilizes an intersection table 218, which will be described in more detail below.

Figure 3:
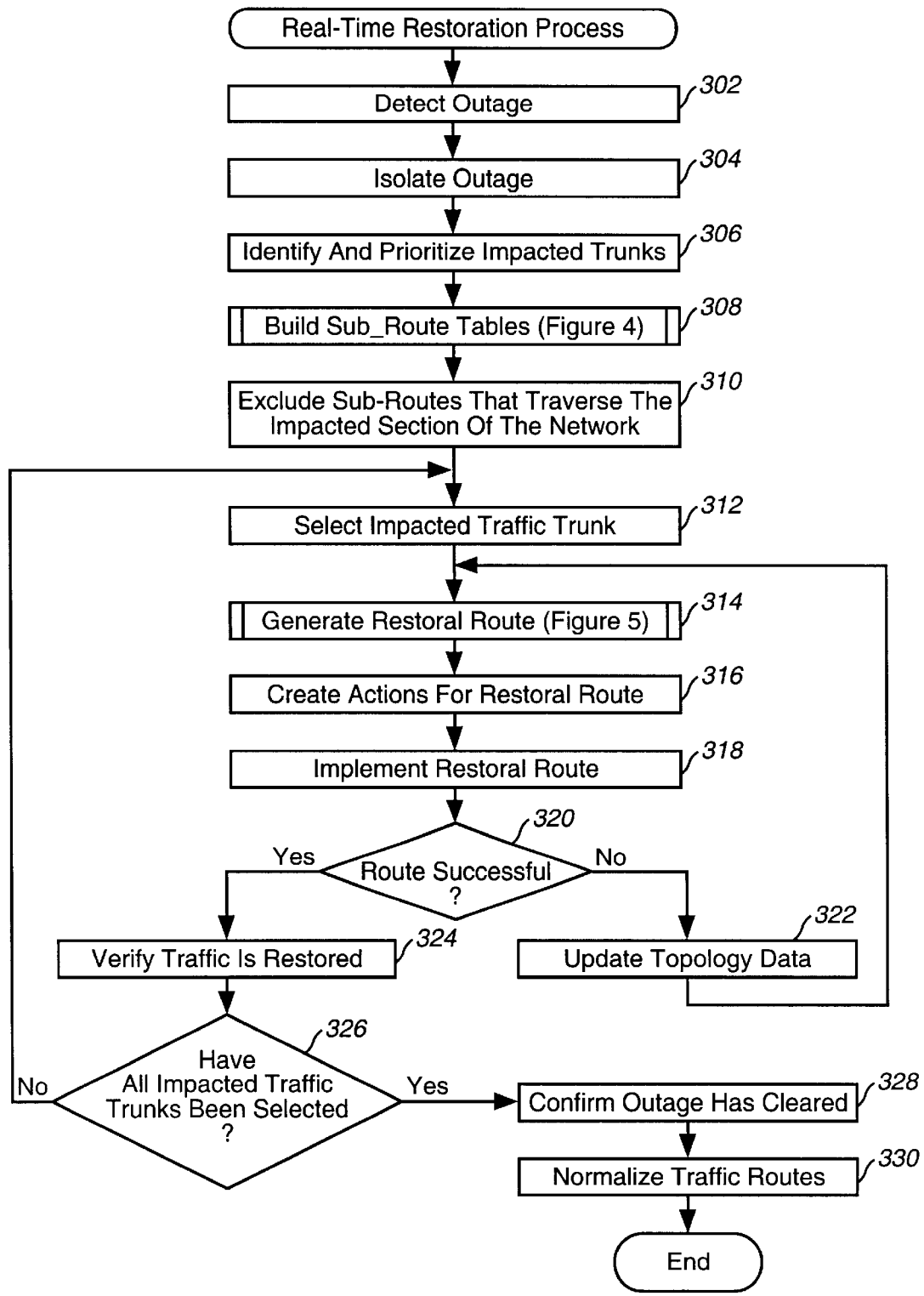
FIG. 3 is a flow chart illustrating the steps performed by the real time restoration process of FIG. 2.

FIG. 3 illustrates the steps that are performed to realize a network restoration in the illustrative embodiment of the present invention. Initially, alarms 220 are received over the data links 214 from restoration network devices 202. The restoration network devices 202 generate alarms when a network failure occurs. These alarms are analyzed to identify the location of the failure within the telecommunications network. The alarms and methods for determining the location of network outages are described in more detail in application Ser. No. 08/758,111, entitled "Method and Apparatus for Determining Maximum Network Failure Spans for Restoration," application Ser. No. 08/753,559, entitled "Method and Apparatus for Isolating Network Failures by Applying Alarms to Failure Spans" and application Ser. No. 08/753,560, entitled "Method and Apparatus for Isolating Network Failure by Correlating Paths Issuing Alarms with Failure Spans," which were all filed on Nov. 26, 1996 and which are all incorporated explicitly by reference herein.

The alarms 220 are received by the real time restoration process 208 so that the real time restoration process detects the outage or failure that prompted the alarms (Step 302 in FIG. 3). The real time restoration process 208 analyzes alarms 220 to isolate the location of the network outage (Step 304 in FIG. 3). The process of isolating the location of the outage is described in more detail in the pending patent applications referenced above. The outage is isolated to a single "failure span," where a failure span is a maximum length span that can be restored with a single restoral route. The trunks that are affected by the outage are identified and prioritized based upon characteristics of the trunk (Step 306). Certain trunks are assigned higher priority for early restoral.

The real time restoration process 208 then proceeds to build a set of sub-route tables (Step 308 in FIG. 3). In this capacity, the real time restoration process 208 acts as a sub-route generator. The sub-route tables include all sub-routes that may utilized to build restoral routes that fall within a designated cost limit. This cost limit serves as a threshold cost that may not be exceeded. Those skilled in the art will appreciate that a number of different cost limits may be used. Each of the sub-routes is built from spare capacity within the telecommunications network 100. "Spare capacity" is capacity that is not currently assigned to carry network traffic. A "sub-route" constitutes a portion of the network that may be used as part of a restoral route. Each sub-route may be viewed as a path leading from a first end node to a second end node, where an end node constitutes a terminus node for a sub-route. One example of a cost limit is a number of inter-node hops. For example, in FIG. 1, if a cost limit of three inter-node hops is designated, then a route that traverses nodes I, E and F (i.e., three hops) is included in the sub-routes but a route that traverses I, E, F and G (i.e., four hops) is not.

Each sub-route table has the following format:

| Sub-route | |
| --- | --- |
| unsigned long | end_node_id1. |
| unsigned long | end_node_id2. |
| int | cost |
| int | num_spans |
| span | *span[4] |
| boolean | used_flag |

The "end_node_id1" field of the sub-route table identifies a first end node for the sub-route associated with the sub-route table. Similarly, the end_node_id2 field holds an identifier for the other end node in the sub-route.

The "cost" field holds a value that identifies the cost of the sub-route (e.g., the number of internode hops in the sub-route).

The "num_spans" field identifies the number of spans in the sub-route.

The "*spans[4]" field is a pointer to the span records for the spans that are included in the sub-route. Where a cost limit of greater 4 internode hops is used, the spans[ ] array will include more than 4 elements.

The "used_flag" field is a boolean field that identifies whether the sub-route is being used or not. This allows a sub-route to be avoided where all spans of the sub-route are already in use.

Those skilled in the art will appreciate the format of the sub-route table set forth above is intended to be merely illustrative and not limiting of present invention. Those skilled in the art will appreciate that the information regarding routes need not be stored in a table but may also be stored in other varieties of data structures. Further, additional fields may be included in such data structures, and there is no need to include all of the fields that are set forth above.

Those skilled in the art will also appreciate that the sub-route tables may be built at a different time in the restoration process than shown in FIG. 3. For example, the sub-route tables may be built before the identification and prioritization of the impacted trunks takes place (i.e., before Step 306 in FIG. 3). The sub-route tables may even be built before the network outages are detected. Details regarding the building of the sub-route tables will be provided below relative to FIG. 4.

Figure 4:
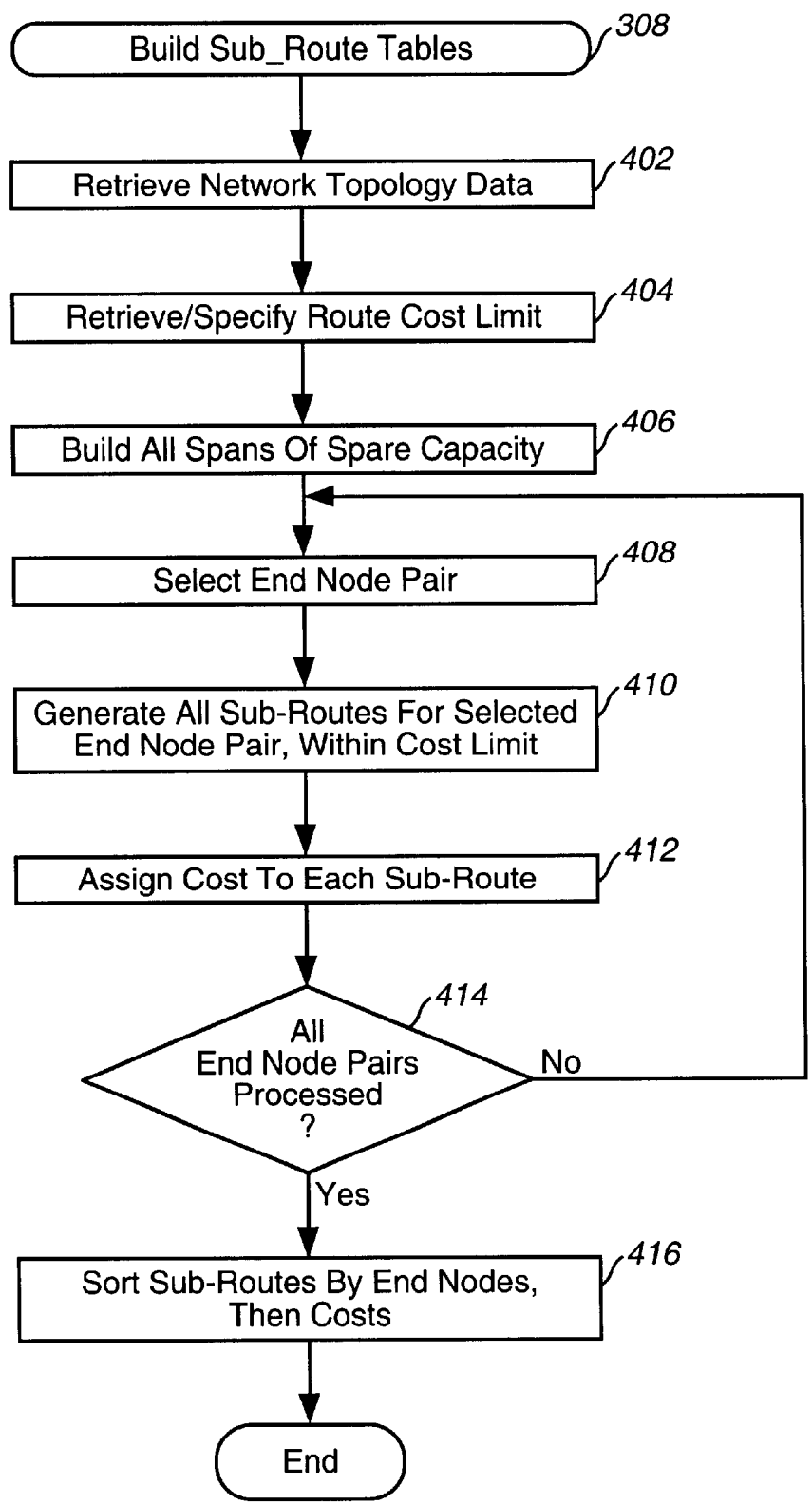
FIG. 4 is a flow chart illustrating the steps that are performed to build the sub-route tables.

FIG. 4 depicts the steps that are performed to build sub-route tables in the illustrative embodiment of the present invention (i.e., Step 308 in FIG. 3). Initially, the real time restoration process 208 retrieves network topology data 214 from network topology database 216 (Step 402 in FIG. 4). Each of the components within the telecommunications network 100 may be modeled as an object or record within the network topology database 216. The network data is used to build the sub-route tables. The real time restoration process 208 then specifies a cost limit that is to be applied for the sub-routes (Step 404 in FIG. 4). As was discussed above, this cost limit may be specified as a number of internode hops. As the sub-routes are built purely from spare capacity, all spans of spare capacity must be built from the specific capacities of the interconnections between nodes as identified by the topology data (Step 406 in FIG. 4).

The building of a sub-route table proceeds iteratively on a per end node pair basis. This process begins by the real time restoration process 208 selecting an end node pair (Step 408 in FIG. 4). All possible sub-routes that lie within a specified cost limit are generated for the given end node pair (Step 410 in FIG. 4). The cost associated with the generated sub-routes are assigned to the sub-routes (Step 412 in FIG. 4). This process is repeated until all end node pairs have been processed (see Step 414 in FIG. 4). The resulting sub-routes are sorted by end nodes and then by cost (Step 416 in FIG. 4).

An example is helpful to illustrate the identification of sub-routes in accordance with the flow chart of FIG. 4. Suppose that a cost limit of three node hops is designated for the telecommunications network 100 depicted in FIG. 1. Further suppose that the selected end nodes are end node A and end node F. The sub-routes that fall within the three hop cost limits include A-I-E-F and A-I-J-F. Sub-route A-B-J-F is excluded as lying along the impacted trunks.

Once all the sub-route tables have been built, the number of sub-route tables that are candidates for inclusion in the restoral route is reduced by excluding sub-routes that traverse the impacted section of the network, (i.e., the span or spans where the outage occurred) from selection (Step 310 in FIG. 3). The real time restoration process 208 begins to generate and implement restoral routes for each of the impacted trunks. The impacted trunks are processed one at a time based upon the priority established in Step 306. Thus, the next step is to select an impacted traffic trunk that has the highest priority (Step 312 in FIG. 3). A restoral route is generated for the selected traffic trunk using sub-routes from the sub-route table, as will be described in more detail below relative to FIG. 5 (Step 314). The real time restoration process 208 creates actions 222 for implementing the restoral route by sending commands over the data links 204 to the restoration network devices 202 (Step 316 in FIG. 3). Examples of actions 222 include the cross connecting and disconnecting of trunks by the DXCs that constitute the restoration devices 202. The restoration network devices 202 then proceed to implement the restoral routes (Step 318 in FIG. 3).

The restoration network devices 202 send confirmations back to the real time restoration process 208 to confirm that the appropriate actions have been taken. If the restoral route has been successfully implemented (see Step 320 in FIG. 3), the real time restoration process 208 verifies that traffic is restored in the telecommunications network over the implemented restoral route (Step 324 in FIG. 3). If the restoral route was not successfully implemented, the topology data stored within the restoration database 212 is updated to exclude the capacity associated with that restoral route for use in new restoral routes (Step 322 in FIG. 3). The process is repeated beginning at Step 314 of FIG. 3.

If the restoral route is successfully implemented (see Step 320 in FIG. 3) and verification that the traffic has been restored is received (see Step 324 in FIG. 3), the real time restoration process 208 determines whether all impacted traffic trunks have been selected and processed (see Step 326 in FIG. 3). If there are remaining traffic trunks that have been impacted by the network outage, the traffic trunks are processed in sequence according to priority by repeating the above described steps beginning at Step 312 of FIG. 3. On the other hand, once all of the impacted traffic trunks have been processed the real time restoration process 208 confirms that the outage has cleared (Step 328 in FIG. 3). When the outages clear, there should no longer be any alarms being received by the real time restoration process 208 from the impacted region. The real time restoration process 208 normalizes the traffic routes according to the traffic routing policies implemented therein (Step 330 in FIG. 3).

Figure 5:
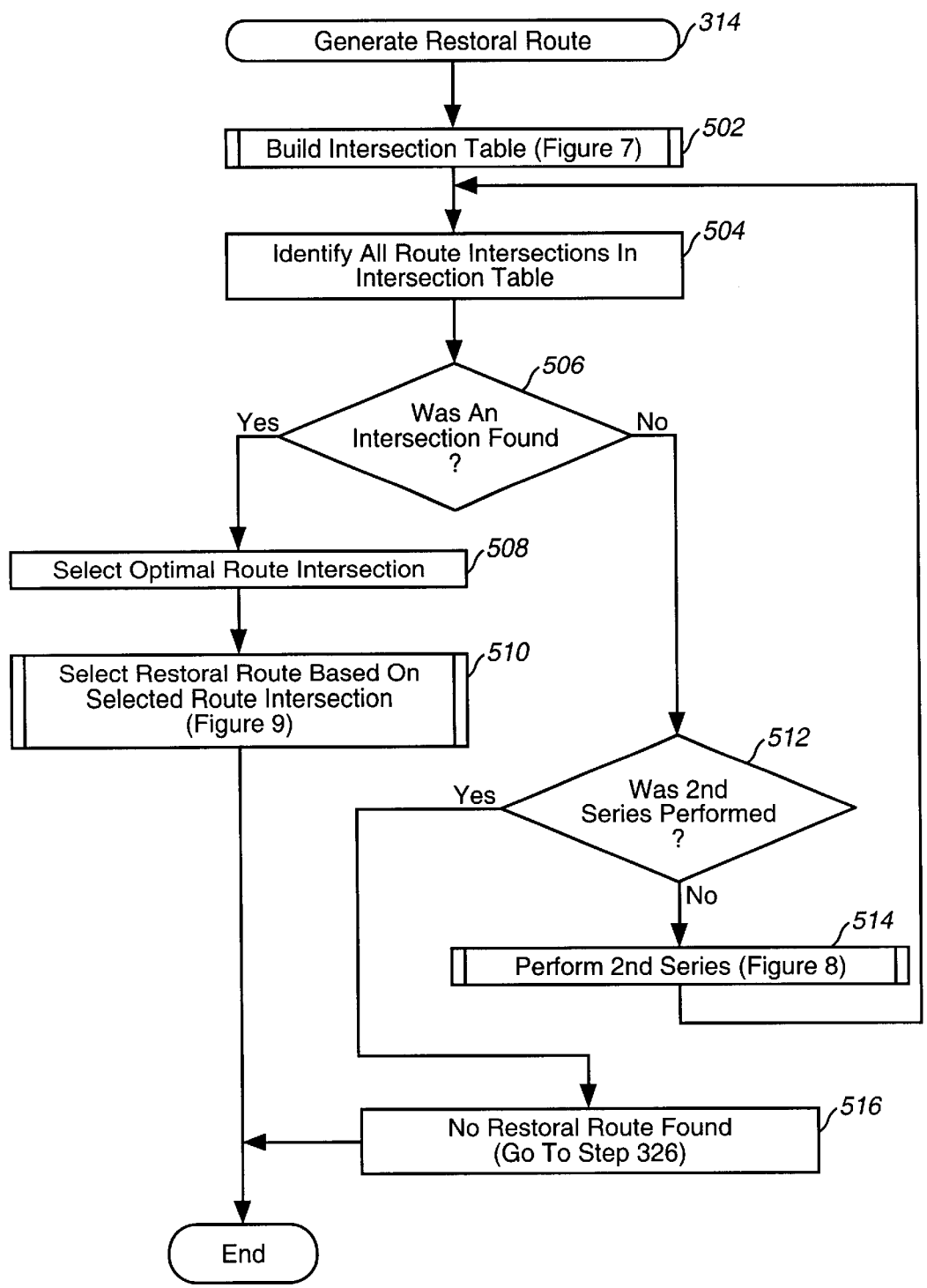
FIG. 5 is a flow chart illustrating the steps that are performed to generate a restoral route.

FIG. 5 depicts the steps that are performed in generating a restoral route for a given impacted trunk (i.e., Step 314 in FIG. 3). Initially, an intersection table is built (Step 502 in FIG. 5). The intersection table identifies instances where a sub-route that originates from a lefthand node intersects (i.e., shares at least one common node) with a sub-route that originates from a righthand node. A lefthand node is one that lies on the "left-side" of the network outage and a righthand node is one that lies on the "right-side" of a network outage. Such intersecting sub-routes are used to build a restoral route, as will be described in more detail below.

Figure 7:
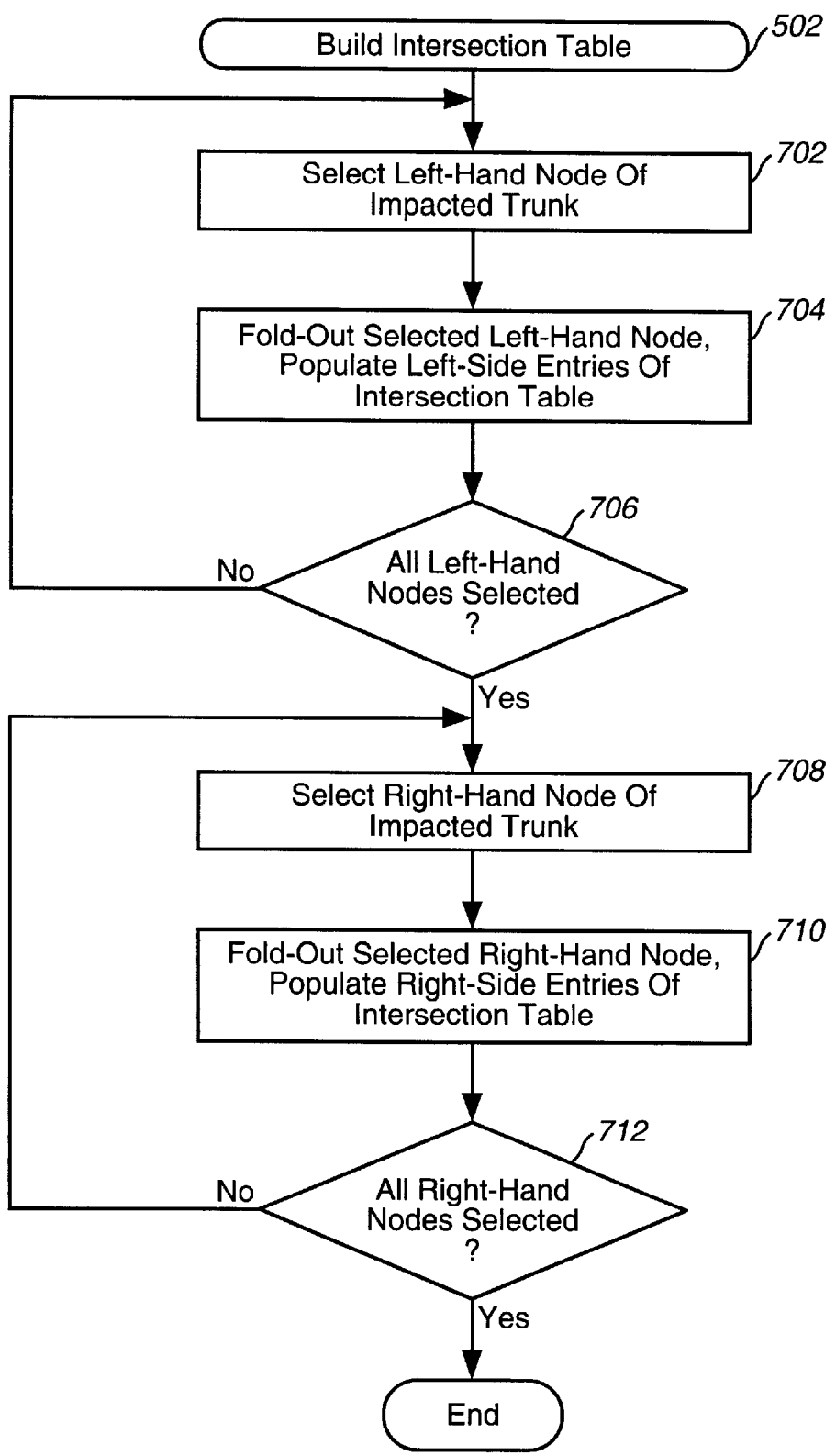
FIG. 7 is a flow chart illustrating the steps that are performed to build an intersection table.

FIG. 7 depicts steps that are performed to build an intersection table (see Step 502 in FIG. 5). Initially, a lefthand node of an impacted trunk is selected (Step 702 in FIG. 7). For example, in the telecommunications system shown in FIG. 1, nodes A and B are lefthand nodes on the impacted trunk. The selected lefthand node is then "folded out." Folding out entails identifying from the sub-route table all nodes that are end nodes from a sub-route that begins from the node being folded out. End nodes of sub-routes that fall along the "left-side" of the impacted trunk are excluded. Thus, sub-routes from nodes A to B will be excluded in the example case depicted in FIG. 1. The "left-side" entries of the intersection table are then populated (Step 704 in FIG. 7). This process is repeated until all lefthand nodes have been selected (see Step 706 in FIG. 7).

The building of an intersection table next proceeds by filling in entries of the "right-side" field of the table. To that end, the righthand nodes of the impacted trunks are selected (Step 708 in FIG. 7). In the example depicted in FIG. 1, the righthand nodes include nodes C and D. The righthand nodes are folded out in a manner like that described relative to the lefthand nodes. The "right-side" entries of the intersection table are populated accordingly (Step 710 in FIG. 7). This process repeats itself for the righthand nodes beginning at Step 708 until all righthand nodes have been selected and processed (see Step 712 in FIG. 7).

FIG. 10 depicts an example of an intersection table. As can be seen in FIG. 10, each row in an intersection table corresponds to a node in the telecommunications network 100. Each row includes a node field that identifies the node associated with the row. Each row also includes a "left-side" field and a "right-side" field. The "left-side" field holds identification information that identifies any lefthand node that is an end node of a sub-route that has as its other end node the node associated with the row. Likewise, the "right-side" field holds identification information that identifies any righthand nodes that are end nodes of a sub-route that has as its other end node, the node associated with the row. The costs of the associated sub-routes are stored in the "left-side" and "right-side" fields.

An example is helpful to illustrate what kind of data is stored in the intersection table of FIG. 10. The intersection table shown in FIG. 10 has a three internode hop cost limit. Consider the row associated with node F. The "left-side" field includes an entry for end node A because there is a sub-route (i.e., either A-I-E-F or A-I-J-F) that is within the cost limit, that connects node A with node F and node A is on the lefthand side of the impacted trunk. An entry for node B is also on the "left-side" field because there is a sub-route that is within the cost limit, that interconnects nodes B and F (i.e., B-J-F), and end node B is on the lefthand side of the impacted trunk. Node C has an entry on the "right-side" field of this row because the sub-route (i.e., C-K-G-F) that interconnects node C with node F within the cost limit, and node C is on the righthand side of the impacted trunk.

Once the intersection table has been built for the impacted trunk, all sub-route intersections within the intersection table are identified (Step 504 in FIG. 5). An "intersection" is found in a row where there is an non-null entry in both the "left-side" and "right-side" fields. For the example intersection table shown in FIG. 10, the rows for nodes F, G, N and P include intersections.

The real time restoration process 208 checks whether an intersection is found in the intersection table (Step 506 in FIG. 5). If an intersection is found, the optimal intersection route is selected (Step 508 in FIG. 5). The optimal route is the one having the lowest cost. The selection of the route constitutes a selection or combination of the two end node pairs that intersect. For the example depicted in FIG. 10, the route comprising sub-routes A-F and C-F may be selected as a first option, or the route comprising sub-routes A-P and D-P may be selected. The pair of sub-routes having the lowest cost is the one that is selected. The restoral formed by combining the sub-routes is then employed, as will be described in more detail below relative to FIG. 9A and 9B (Step 510 in FIG. 5).

Figure 8:
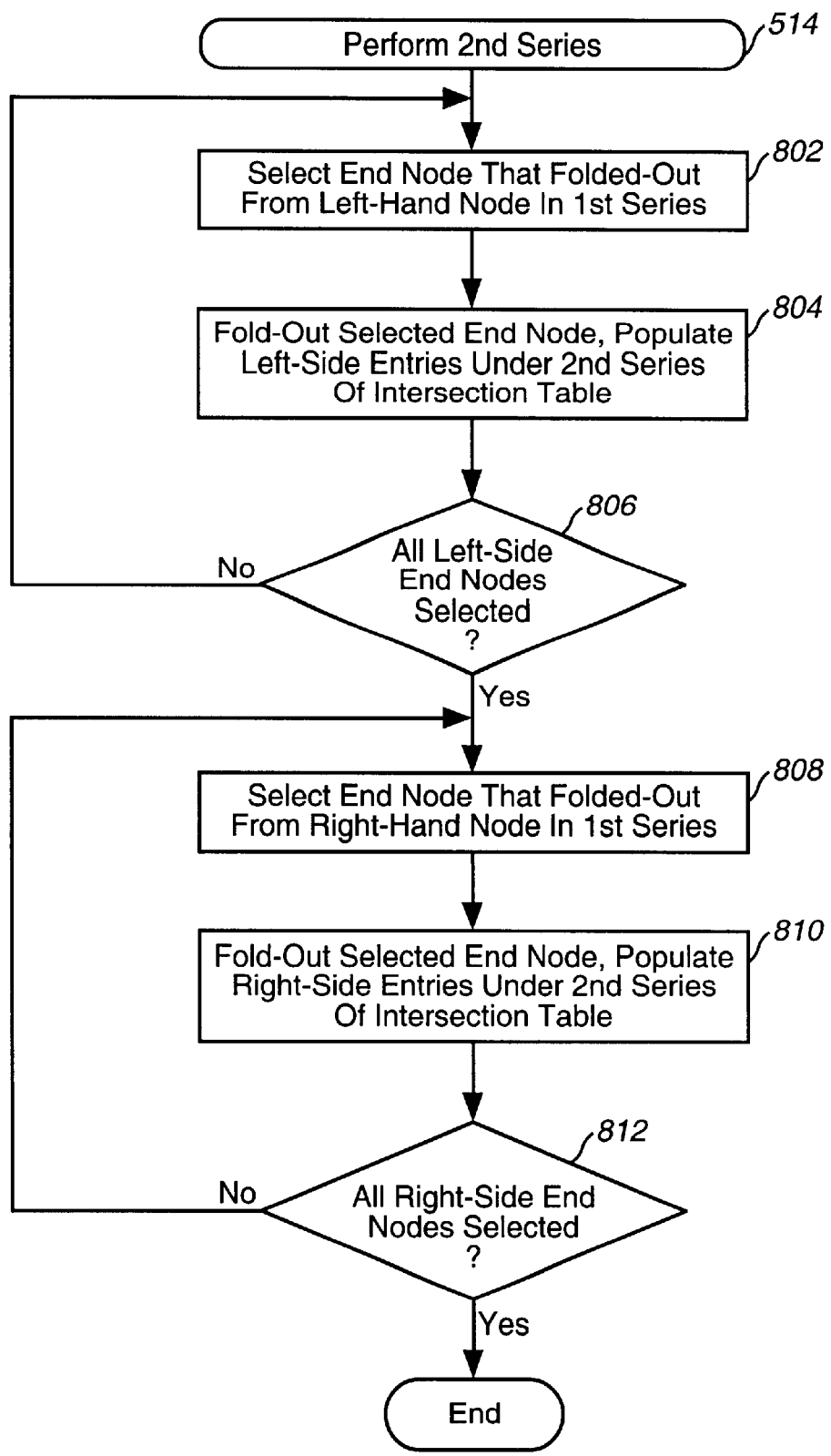
FIG. 8 is a flow chart illustrating the steps that are performed when a second series of analyses are performed to fold out sub-routes.

There may be instances in which the intersection table does not include any intersections (see Step 506 in FIG. 5). In such a case, a second series of analysis is performed (see Steps 512 and 514 in FIG. 5). FIG. 8 depicts the steps that are performed when a second series of analysis is performed. The second series of analysis entails folding out from the end nodes of sub-routes that result from the first series of analysis. Initially, the end node that was folded out from the lefthand in the first series is selected (Step 802 in FIG. 8). The selected end node is then folded out, and "left-side" entries are populated from the folding out on the second series intersection table (Step 804 in FIG. 8).

FIG. 11 shows an example of an intersection table that includes results of both a first and a second series of analyses. With the intersection table in FIG. 11, the cost limit is 2 internode hops rather than 3 internode hops in the intersection table in FIG. 10. In the row for node F, the first series only includes a "left-side" entry for node B. The second series entries are for sub-routes that are at most two hops away from node F. Thus, node F (which is two nodes away from node K and interconnected by the sub-route K-G-F) is added to the "left-side" field for the second series of node K. This process is repeated for all the "left-side" end nodes beginning with Step 802 (see Step 806 in FIG. 8).

Similar steps are performed for end nodes of sub-routes that were folded out from righthand nodes in the first series. These end nodes are selected (Step 808 in FIG. 8) and folded out. The resulting "right-side" entries are populated in the intersection table. With respect to the example of row K in FIG. 11, nodes C, G and H are all end nodes for sub-routes that have two or less internodes hops from node K. This process is repeated until all of the "right-side" end nodes have been processed (see Step 812 in FIG. 8).

After the second series of analyses is performed (see FIG. 8), the resulting intersection table is processed as described above, beginning with Step 504. If after the second series of analyses is performed, there is still no intersection found in Step 506 of FIG. 5, no restoral route is generated for the given trunk (Step 516 in FIG. 5). The processing may then resume at Step 326 of FIG. 3 with a new impacted trunk (if any).

Figure 9A:
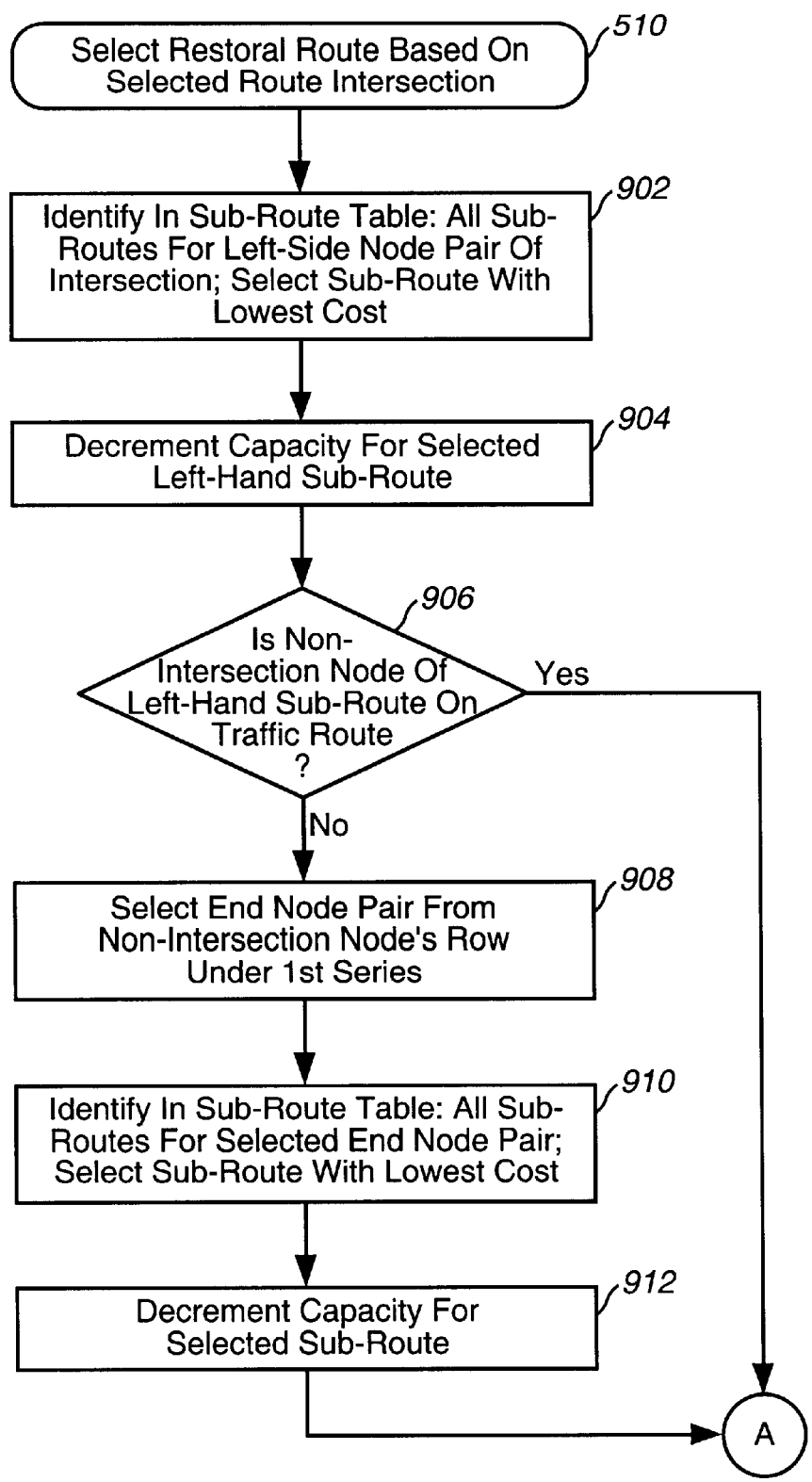
FIGS. 9A and 9B are flow charts illustrating the steps that are performed to select a restoral route based upon route intersections.
Figure 9B:
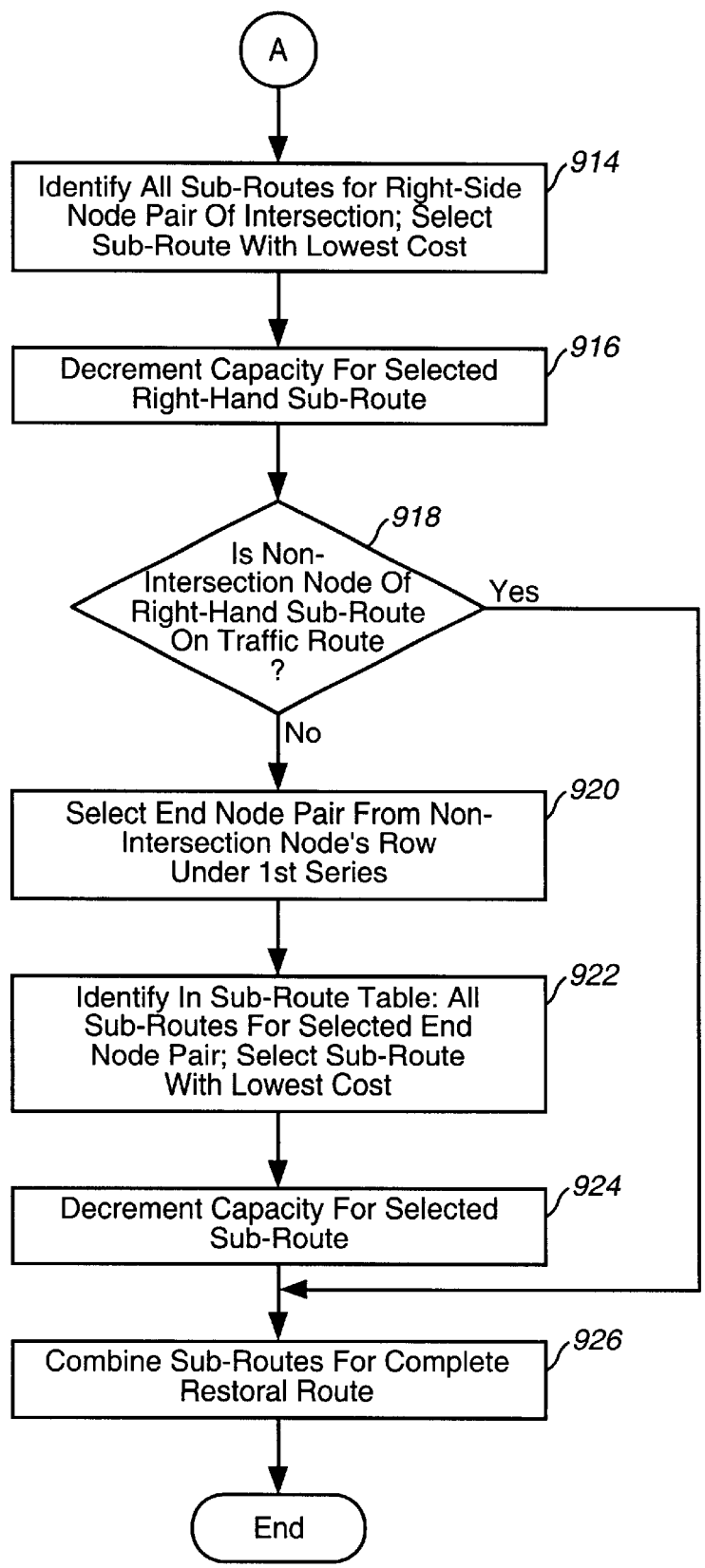

FIGS. 9A and 9B show the steps that are performed to select a restoral route based upon intersections that have been found in an intersection table (i.e., Step 510 in FIG. 5). Initially, all the sub-routes for the "left-side" end node pairs of intersections in the intersection table are identified. For example, in the intersection table of FIG. 10, the sub-routes that extend between nodes A and F and nodes B and F are identified. The lowest cost route is selected (see Step 902 in FIG. 9A). Sub-routes B-G, A-N and A-P are also identified. Sub-routes B-J-F and A-M-N have the lowest cost; one of them is selected. Other cost factors could be utilized to differentiate between such sub-routes that have a same internode hop cost.

The sub-route table is updated to decrement capacity for the selected lefthand sub-route (see 904 in FIG. 9A). Since the selected sub-route is being utilized for restoral, the capacity occupied by the selected sub-route must be reflected in the sub-route table.

A check is then made whether the non-intersection end node for the lefthand sub-route that has been selected is on the originally impacted trunk (see 906 in FIG. 9). For example, if the selected intersection includes the sub-route A-I-E-F, node A is the non-intersection node. This process is equivalent to checking wherein the intersection was found from a second series in the intersection table. If the intersection was found in the second series, a non-intersection node will not be on the original impacted traffic trunk (Step 906 in FIG. 9A).

In the instances where the non-intersection node of the lefthand sub-route is on the originally affected traffic trunk (see Step 906 in FIG. 9A), all sub-routes for the "right-side" node pair of the intersection are identified and the sub-route with the lowest cost is selected (Step 914 in FIG. 9B). Thus, if the sub-route between nodes B-J-F is chosen for the "left-side", the sub-route C-K-G-F is selected from the "right-side." The sub-route tables are then updated to reflect the use and capacity for the selected righthand sub-route (Step 916 in FIG. 9B).

In Step 906 of FIG. 9A when it is determined that the non-intersection of the lefthand sub-route is on the originally affected traffic trunk (i.e., the intersection was found from the second series), the end node is not on the originally affected traffic trunk. An end node pair is selected from the non-intersection node under the first series (Step 908 in FIG. 9A). This step is equivalent to selecting the end node pair from the first series fold out for the originally affected traffic trunk node. In the example network shown in FIG. 1, this process selects, the end node pair A-E from row E. In Step 910 of FIG. 9A, all sub-routes within the cost limits from this end node pair are identified, and the sub-route with the lowest cost is selected. The resulting use of capacity is reflected by updating the sub-route tables (Step 912 in FIG. 9A).

A similar process is performed in Step 920 of FIG. 9B when it is determined in Step 918 of FIG. 9B that the non-intersection node is not on the righthand side of the originally affected traffic trunk. Specifically, an end node pair is selected from the non-intersection nodes row in the first series (Step 920 in FIG. 9B). All sub-routes for the selected end node pairs are identified and the sub-route with the lowest cost is selected (Step 922 in FIG. 9B). The sub-route tables are updated to reflect the decrease in capacity due to the selection of the lowest cost sub-route (Step 924 in FIG. 9B). Lastly, selected sub-routes are combined to complete the restoral route (Step 926 in FIG. 9B).

Figure 6:
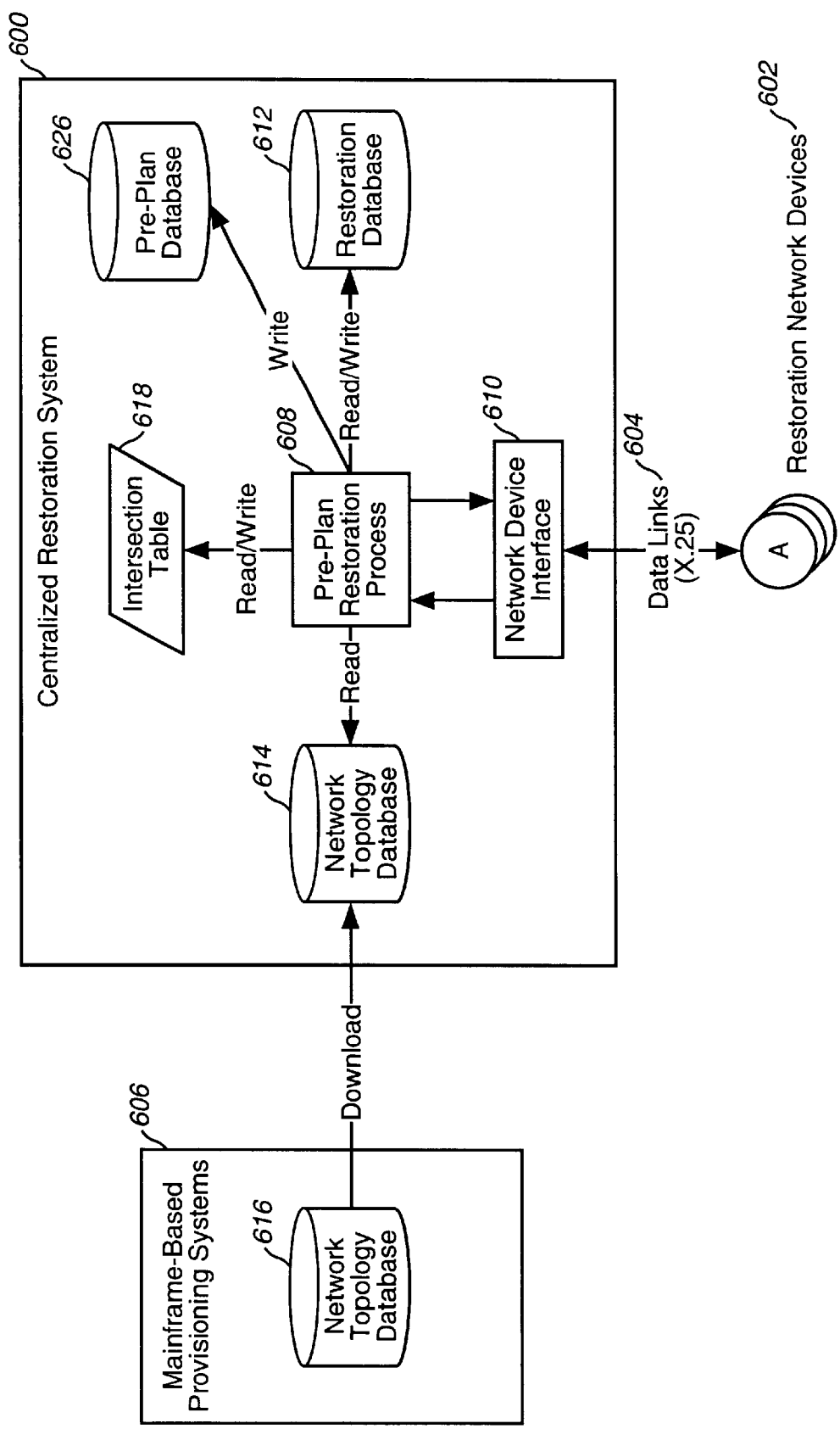
FIG. 6 illustrates a centralized restoration system that implements a pre-plan restoral generation approach in accordance with the illustrative embodiment of the present invention.

In an alternate embodiment of the present invention, the above-described approach is not used in a real time restoration system (i.e., a dynamic route generation restoration system) but rather is used in a pre-plan restoration system. FIG. 6 depicts the centralized restoration system 600 in this in this alternative embodiment. The centralized restoration system 600 communicates via data link 604 to restoration network device 602, such as described above. The centralized restoration system 600 communicates with a mainframe-based provisioning system 606 comprising network topology database 616. A local copy 614 of the network topology database is downloaded into the centralized restoration system 600. A pre-plan restoration process 608 communicates with the restoration network device 602 over a network device interface 610. The pre-plan restoration process 608 builds and has access to an intersection table 618 and a restoration database 612 that includes other tables. A pre-plan database 626 is provided to bold pre-plans that are used in restoring the network.

Figure 12:
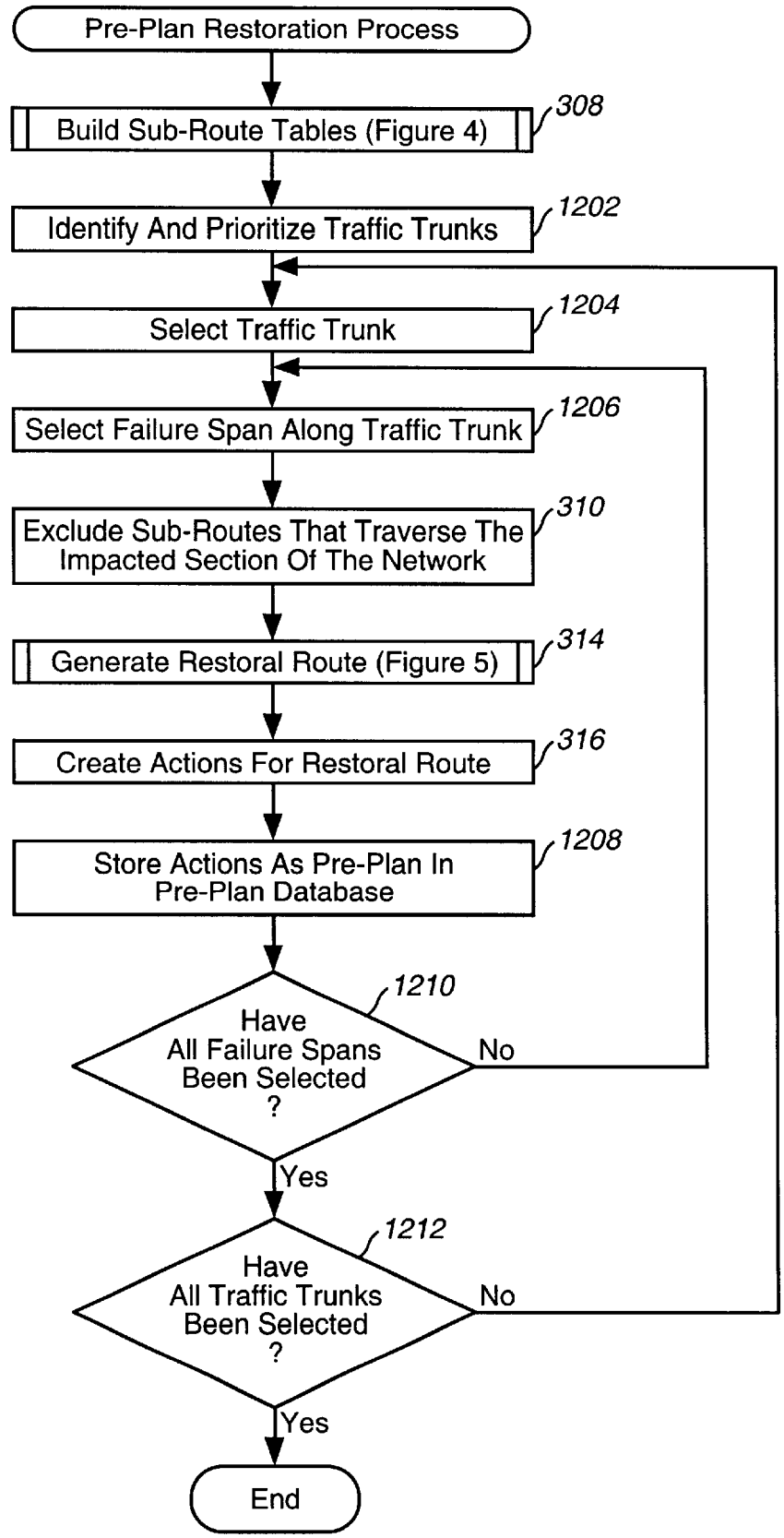
FIG. 12 is a flow chart illustrating the steps that are performed when a pre-plan restoration process is performed in the illustrative embodiment of the present invention.

FIG. 12 depicts the steps that are performed in this alternate embodiment. Initially, the sub-route tables are built (Step 308 in FIG. 12). As has been described above relative to FIG. 4, the traffic trunks that are affected by the network outage are identified and prioritized (Step 1202 in FIG. 12). The affected traffic trunks are processed in sequence with the selection of the highest priority traffic initially (Step 1204 in FIG. 12). A failure span is selected along the selected traffic trunk (Step 1206 in FIG. 12). Sub-routes that traverse the impacted section of the network are excluded (Step 310 in FIG. 12). A restoral route is generated using the pre-plans in accordance with the steps depicted in FIG. 5 (Step 314 in FIG. 12). The actions are created to realize the restoral (Step 316 in FIG. 12). The actions are stored as a pre-plan in the pre-plan database 626 (Step 1208 in FIG. 12). If all of the failure spans have been selected (see Step 1210 in FIG. 12), the pre-plan restoration process checks whether all traffic trunks have been selected (Step 1212 in FIG. 12). After all traffic trunks have been selected, the process is completed. If the all traffic trunks have not been selected, the process begins again starting at Step 1204 with a new traffic trunk. If all the failure spans within the traffic trunks have not been selected, the process is repeated beginning at Step 1206.

While the present invention has been described with reference to an illustrative embodiment thereof, those skilled in the art will appreciate the various changes in form and detail may be made without departing from the intended scope of the present invention as defined in the appended claims.

What is claimed is:

1. In a telecommunications network having nodes interconnected by connections and a computing resource for directing restoration of the network from a failure, a method comprising the steps of:

with the computing resource, generating restoral sub-routes, wherein each restoral sub-route is a portion of the network having nodes, including end nodes that constitute respective ends of the sub-route, and connections that connect nodes, and wherein each restoral sub-route has an associated cost less than a threshold cost;

identifying a failure in the network and identifying a failure span that is impacted by the failure, said failure span including nodes wherein said nodes are logically divisible into nodes positioned on a first side of the failure and nodes positioned on a second side of the failure;

identifying selected ones of the sub-routes that have a selected end node that is one of the nodes of the failure span that is impacted by the failure, said selected end node being positioned on the first side of the failure;

identifying given ones of the sub-routes that have a given end node that is one of the nodes of the failure span that is impacted by the failure, said given end node being positioned on the second side of the failure; and employing one of the selected sub-routes and one of the given sub-routes to create a restoral route for restoring the telecommunications network from the failure.

2. The method of claim 1 wherein the method further comprises the step of identifying intersecting sub-routes comprising at least one sub-route from the selected sub-routes and at least one sub-route for the given sub-routes that share a common end node and wherein the sub-routes that are employed to create the restoral route are chosen from the intersecting sub-routes.

3. The method of claim 2 wherein the computing resource includes a storage and, wherein information that identifies the intersecting sub-routes is stored in a data structure on the storage.

4. The method of claim 2 wherein the computing resource includes a storage and wherein information that identifies the intersecting sub-routes and a lowest cost sub-route among the given sub-routes in the intersecting sub-routes are chosen to be employed to create the restoral route.

5. The method of claim 1 further comprising the step of using the restoral route to restore the telecommunications network from failure.

6. The method of claim 1 wherein the associated cost for each of the sub-routes is determined by how many nodes are in the sub-route.

7. The method of claim 1 wherein the restoral route is dynamically created in response to the failure of the telecommunications network.

8. The method of claim 1 wherein the connections included in the sub-routes are used for spare capacity.

9. The method of claim 1 further comprising the step of determining a location of the failure within the network so as to be able to identify the traffic route that is impacted by the failure.

10. The method of claim 1 wherein the nodes include network restoration nodes for implementing the restoral route and wherein the method further comprises the step of sending commands from the computing resource to the network restoration nodes to implement the restoral route.

11. In a telecommunications network having nodes and connections that interconnect nodes, a method of generating a restoral route for a failure in the network that affect nodes along a given traffic route, comprising the computer implemented steps of:

identifying sub-routes that include, as an end node, one of the nodes on the given traffic route, wherein each sub-route has an associated cost;

identifying a first subset of the sub-routes that share common end nodes that are not on the given traffic route; and where there are sub-routes in the first subset, selecting sub-routes from the first subset that when combined produce the restoral route, said sub-routes being selected based on their associated costs, wherein the given traffic routes include lefthand nodes on a lefthand side of the failure and righthand nodes on a righthand side of the failure and wherein the method further comprises the step of dividing the subroutes into lefthand sub-routes that include as an end node one of the lefthand nodes on the given traffic route and righthand sub-routes that include as an end node one of the righthand nodes of the given traffic route and wherein the selected sub-routes include a lefthand sub-route and a righthand sub-route.

12. The method of claim 11 wherein when the first subset contains no sub-routes, the method further comprises the steps of:

identifying a second subset of sub-routes that each share a common end node with at least one of the sub-nodes in the first subset; and selecting sub-routes from the second subset that when combined produce the restoral route, wherein said sub-routes are selected based on their associated costs.

13. In a telecommunications network having nodes and connections that interconnect nodes, a computer-readable medium holding computer-executable instructions for performing, a method of generating a restoral route for a failure in the network that affects notes along a given traffic route, comprising the computer implemented steps of:

identifying sub-routes that include as an end node one of the nodes on the given traffic route, wherein each sub-route has an associated cost;

identifying a first subset of the sub-routes that share common end nodes that are not on the given traffic route; and where there are sub-routes in the first subset, selecting sub-routes from the first subset that when combined produce the restoral route, said sub-routes being selected based on their associated costs, wherein the given traffic routes includes nodes on a lefthand side of the failure and righthand nodes on a righthand side of the failure and wherein the method further comprises the step of dividing the sub-routes into lefthand sub-routes that include as an end node one of the lefthand nodes on the given traffic route and righthand sub-routes that include as an end node one of the righthand nodes of the given traffic route and wherein the selected sub-routes include a lefthand sub-route and a righthand sub-route.

14. The computer-readable medium of claim 13 wherein, when the first subset contains no sub-routes, the method further comprises the steps of:

identifying a second subset of sub-routes that each share a common end node with at least one of the sub-nodes in the first subset; and selecting sub-routes from the second subset that when combined produce the restoral route, wherein said sub-routes that are selected are based on associated costs.

15. In a telecommunications network having nodes interconnected by connections and a computing resource for directing restoration of the network, a method comprising the computer implemented steps of:

with the computing resource, generating restoral sub-routes, wherein each restoral sub-route is a portion of the network having nodes, including end nodes that constitute respective ends of the sub-route, and connections that connect nodes, wherein each restoral sub-route has an associated cost less than a threshold cost;

for each possible failure span for a failure having a failure point and nodes that are logically divisible into nodes positioned on a first side of the failure point and nodes positioned on a second side of the failure, (i) identifying selected ones of the sub-routes that have a selected end node that is one of the nodes of the failure span that is impacted by the failure, said selected end node being positioned on the first side of the failure;

(ii) identifying given ones of the sub-routes that have a given end node that is one of the nodes of the failure span that is impacted by the failure, said given end node being positioned on the second side of the failure;

(iii) employing one of the selected sub-routes and one of the given sub-routes to create a restoral route for restoring the telecommunications network from the failure.

16. The method of claim 15 wherein the method further comprises the step of using one of the restoral routes to restore the system after a failure of the telecommunications network.

* * * * *